United States Patent [19]
Ro

[11] Patent Number: 5,335,570
[45] Date of Patent: Aug. 9, 1994

[54] AUTOMATIC PIPE CUTTING DEVICE

[75] Inventor: Jong-Ho Ro, Seoul, Rep. of Korea

[73] Assignee: Hankook Metal Co., Ltd., Kyungki, Rep. of Korea

[21] Appl. No.: 38,647

[22] Filed: Mar. 29, 1993

[30] Foreign Application Priority Data

Apr. 7, 1992 [KR] Rep. of Korea .................. 92-5769

[51] Int. Cl.5 ................ B23B 5/14; B23B 13/00
[52] U.S. Cl. .................................. 82/48; 82/53.1;
82/70.2; 82/89; 82/102; 493/10; 493/289
[58] Field of Search ............... 82/48, 53.1, 59, 70,
82/70.2, 71, 80, 89, 100, 101, 102, 126, 127, 901;
493/10, 22, 24, 289

[56] References Cited

U.S. PATENT DOCUMENTS

| 549,707 | 11/1895 | Denney | 82/48 |
|---|---|---|---|
| 684,539 | 10/1901 | Cartwright | 82/53.1 |
| 1,549,429 | 8/1925 | Bartlett | 493/289 |
| 2,168,203 | 8/1939 | Green | 82/48 |
| 3,051,061 | 8/1962 | Baxter et al. | 493/289 |
| 3,611,848 | 10/1971 | Sullivan et al. | 82/53.1 |
| 4,326,438 | 4/1982 | Ballerstein et al. | 82/53.1 |
| 4,370,140 | 1/1983 | Fegley et al. | 493/289 |
| 4,727,783 | 3/1988 | John | 82/53.1 |
| 4,934,225 | 6/1990 | Languillay et al. | 82/53.1 |

FOREIGN PATENT DOCUMENTS 2037642 7/1980 United Kingdom ................ 82/48

Primary Examiner—William E. Terrell

[57] ABSTRACT

An automatic pipe cutting device chiefly cuts a metal pipe of small thickness. This pipe cutting device has a pipe fixing element for clamping and releasing the pipe and a pipe cutter incorporating cutting bits. A pipe cutting length adjuster means with a limit switch and an optical sensor and a pipe discharger are also provided. The pipe cutting device can automatically adjust the cutting length of the pipe, the fixing, the cutting and the discharging of the pipe.

12 Claims, 8 Drawing Sheets

AUTOMATIC PIPE CUTTING DEVICE

BACKGROUND OF THE INVENTION

This invention relates to an automatic pipe cutting device which is generally used for cutting a metal pipe of small thickness, and particularly to an automatic pipe cutting device wherein the cutting length of the pipe is automatically adjusted by means of optical sensor and limit switch, and the fixing, cutting and discharging of the pipe is automatically achieved.

As is generally known, a metal pipe of small thickness is susceptible to modification because of its weak strength. Consequently, special attention should be paid in cutting such a metal pipe. Generally, such pipe which went through a pipe manufacturing process is cut in a predetermined length and produced on a large scale.

Typically, a scissor-type cutting roller has been used to cut a pipe. FIGS. 1 to 3 show a typical method of cutting pipe.

As shown, a typical pipe cutting device comprises a main body 100 incorporating a base plate 112 and a motor 101. An operating rod 105 supported by bearing housings 106, 107 and 108 is mounted on the base plate 112 and connected to a motor shaft 101a through pulleys 102, 103 and belts 104. Holding member 109 and guiding member 110 are fixedly mounted on the center and the front end of the operating rod 105, respectively. A fixed plate 118 is mounted on the one end of the base plate 112 and has guide rails 114 and 114' mounted thereon and at the opposite sides of the guide member 110. Each of the guide rails 116 and 114' has a carriage member 115 or 115'. A bracket 114 or 116', having a cutting roller 117 or 117' is fixed to the front face of the carriage member 115 or 115'. To the rear face of the carriage member 115 or 115' is connected a piston rod 113a or 113a' of air cylinder 113 or 113' which is fixed to the rear side of the guide rail 114 or 114'.

In normal condition in which the motor 101 is stopped, as shown in FIGS. 1 and 2, the carriage members 115 and 115' and the cutting rollers 117 and 117' are spaced at a regular distance from the guiding member 110. In this condition, a worker holds a pipe P which went through a pipe manufacturing process by both hands and insert the pipe P into the guiding member 110 for the front end of the pipe P to be caught by the holding member 109. Thereafter, at the same time as the worker removes his hands from the pipe P, he switches on operating switch of the motor 101 and air cylinders 113 and 113'. This allows the rotating force of the motor 101 to rotate the operating rod 105 through belts 104 and pulleys 102 and 103, thus rotating the holding member 109, guiding member 110 and the inserted pipe P. Consequently, the piston rods 113a and 113a' of the air cylinders 113 and 113 push the carriage members 115 and 115' causing the carriage members 115 and 115' to be moved toward the guiding member 110 along the guide rails 114 and 114'. Simultaneously with the movement, the cutting rollers 117 and 117' of the brackets 116 and 116' are moved toward the guiding member 110, thus pressing and cutting the pipe P like scissors.

In this condition, from the movement when contacting with the pipe P, the cutting rollers 117 and 117' rotate by themselves and cut the pipe P by the force of the rotation of the pipe P. The cutting length of the pipe P is the length from the tip of the cutting rollers 117 and 117' or the shoulders of the guiding members 110 and 110' to the guiding member 109. Accordingly, a worker should release a bolt 111 of the holding member 109 before entering the cutting process to adjust the location of the holding member 109 to conform with the cutting length of the pipe. After the cutting of the pipe P is finished, the motor 101 is stopped, allowing the air cylinders 113 and 113' to return the carriage members 115 and 115' and the cutting rollers 117 and 117'. Then, the worker removes the pipe P by his hands.

The feeding, supplying of the pipe P and the operation of the motor 101 and the air cylinders 113 and 113' of the above-described typical cutting device is controlled manually. Therefore, the typical device has the following disadvantages.

An accident is likely to happen because all the processes have been achieved manually. The productivity is lowered. The manufacturing cost is increased due to the excess of the labor cost. A lot of noise and vibration are produced because the operating rod 105 and the pipe P are rotated simultaneously during the cutting process.

Furthermore, since the typical cutting device is a scissors type in which the cutting rollers 117 and 117' press the periphery of the pipe P which is rotated at high speed, it can cut only the pipe of a predetermined thickness. Accordingly, a pipe of large thickness can not be cut easily, and the cutting face of the pipe gets pressed out of shape, and the cutting length is not uniform, causing the quality of the products and the reliability to lower.

SUMMARY OF THE INVENTION

An object of the present invention to overcome the above-described disadvantages is to provide an automatic pipe cutting device wherein the adjustment of the cutting length, fixing, cutting and discharging of a pipe are achieved automatically.

An automatic pipe cutting device comprising a generally box-shape main body which is opened on the top thereof, a base plate moved sidewards along guide bars which are mounted across support frames fixed on the main body, a pipe fixing means fixed to a pipe receiving portion of the base plate for clamping and releasing pipe which is fed through the center thereof according to the direction of the supply of air which is supplied to air cylinders, a pipe cutting means fixed on the base plate adjacent to the pipe fixing means and having a cutting bit which is rotated by the rotation force of a motor, the bit being moved in the direction of the central axis of the pipe and cutting pipe upon operation of a piston rod of a air cylinder, pipe cutting length adjusting means adjusted to be fixed on an optional position on an operating bar on the base plate, the operating bar extending horizontally to the right or rearwardly, the pipe cutting length adjusting means sensing the passage of a pipe which passes continuously therethrough and producing a signal enabling the pipe fixing means to clamp the passing pipe, and a pipe discharge means for sensing the cutting of a pipe by means of the pipe cutting means and discharging the cut pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
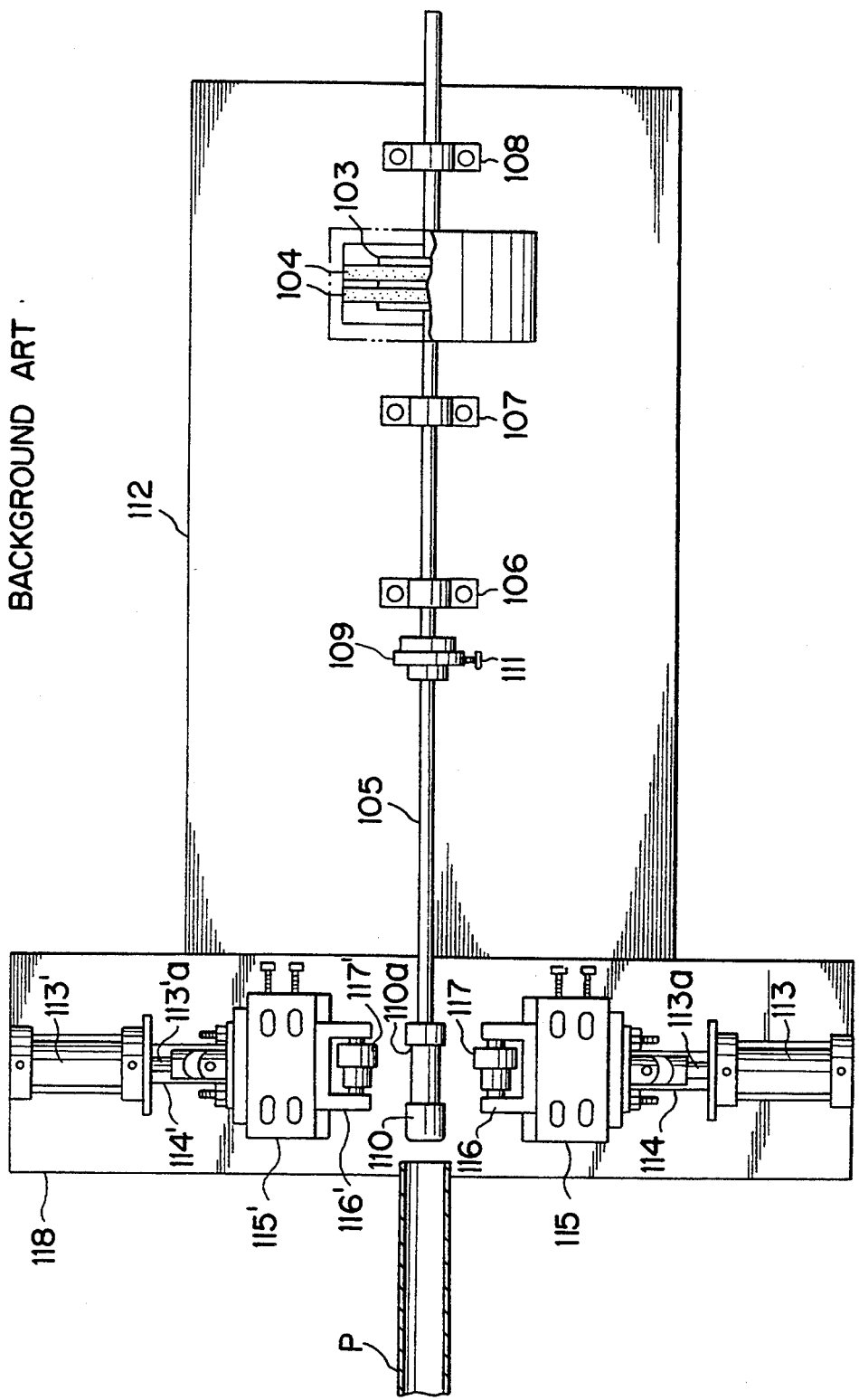
FIG. 1 is a plan view of a conventional pipe cutting device.
Figure 2:
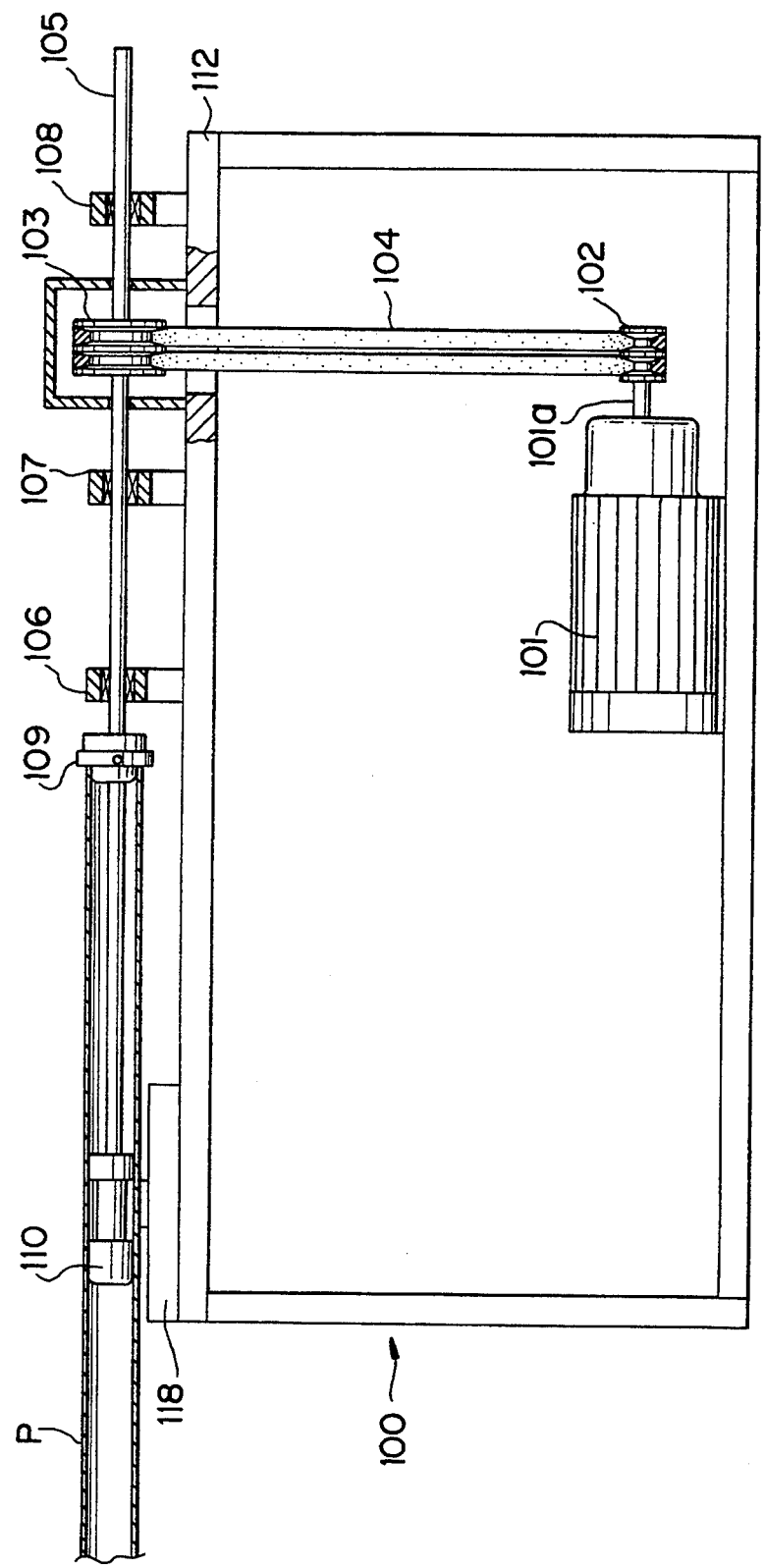
FIG. 2 is a front, sectional view of FIG. 1.
Figure 3:
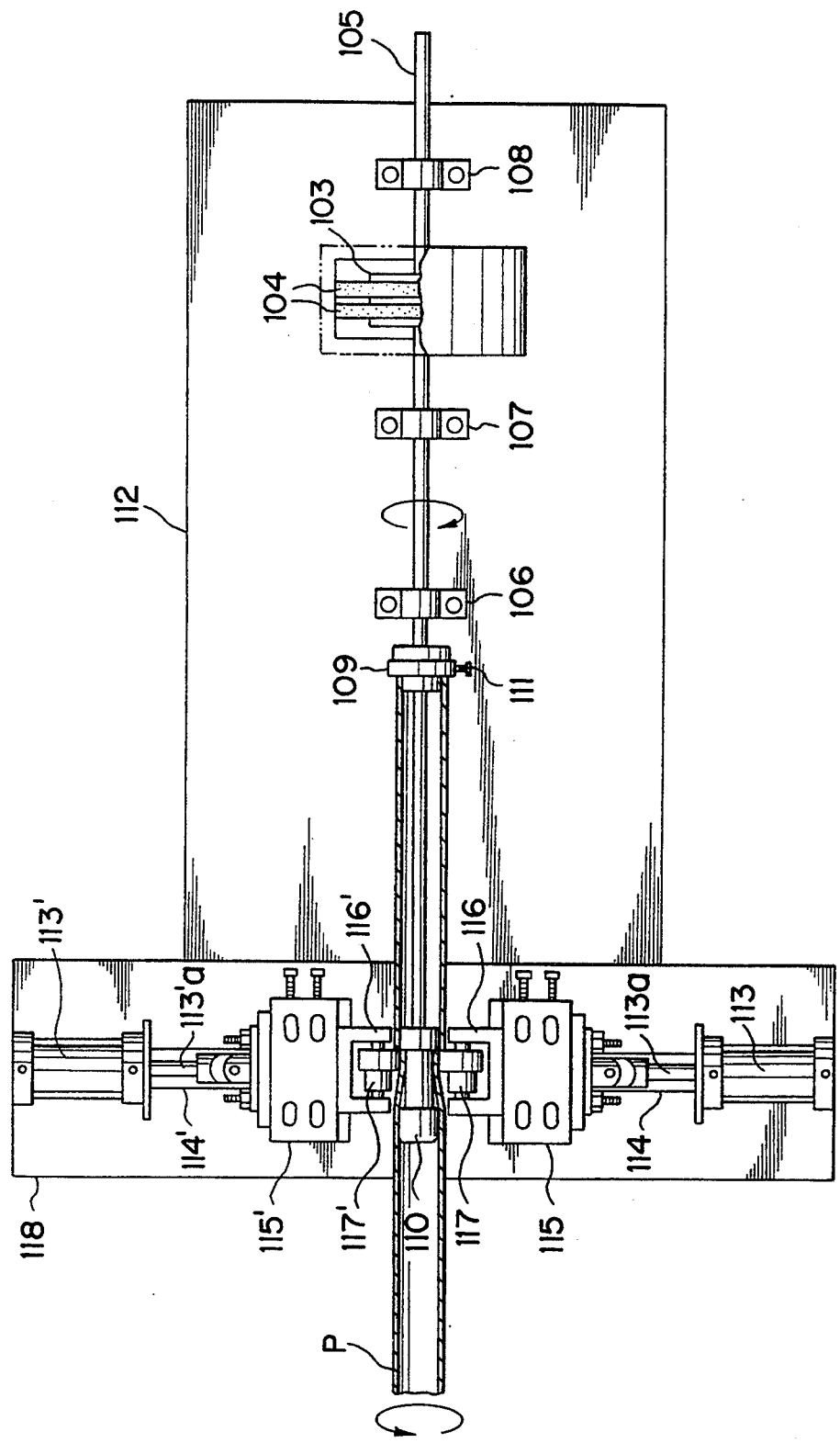
FIG. 3 is a plan view of FIG. 1 in operation.
Figure 4:
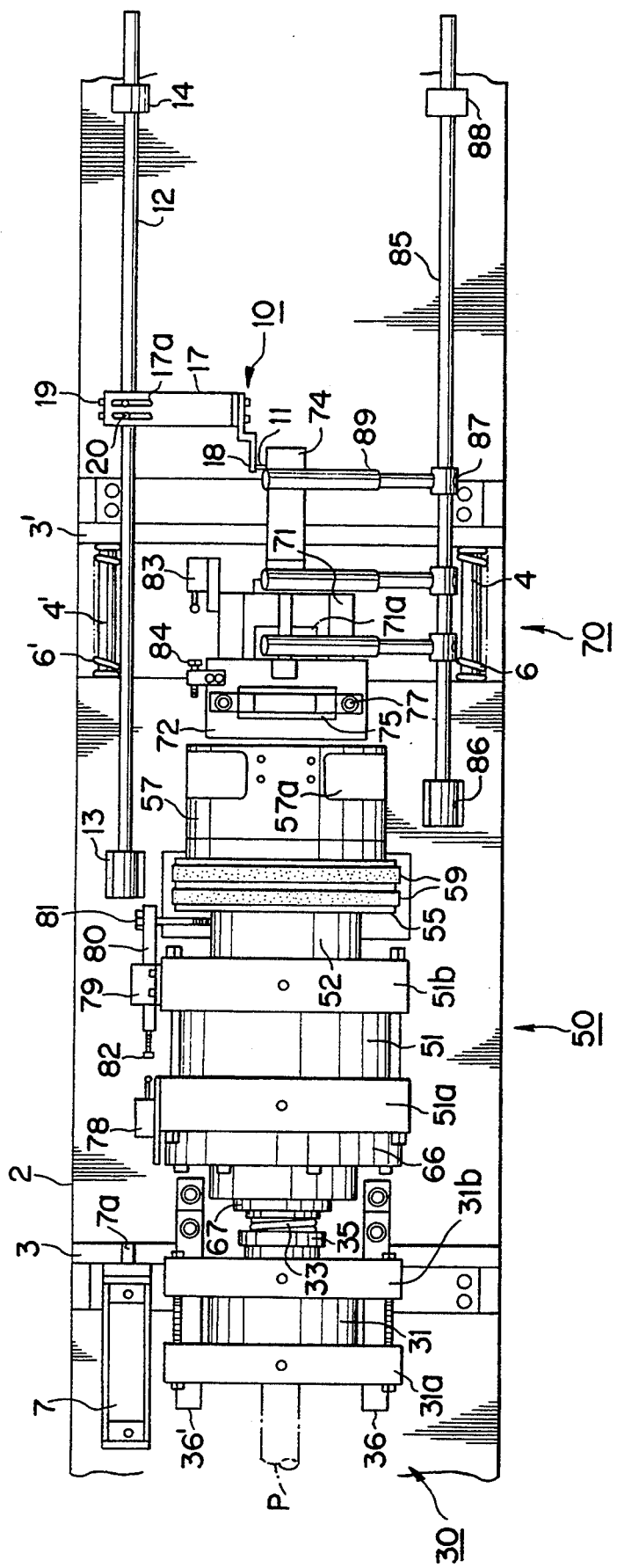
FIG. 4 is a plan view of an automatic pipe cutting device of the present invention.
Figure 5:
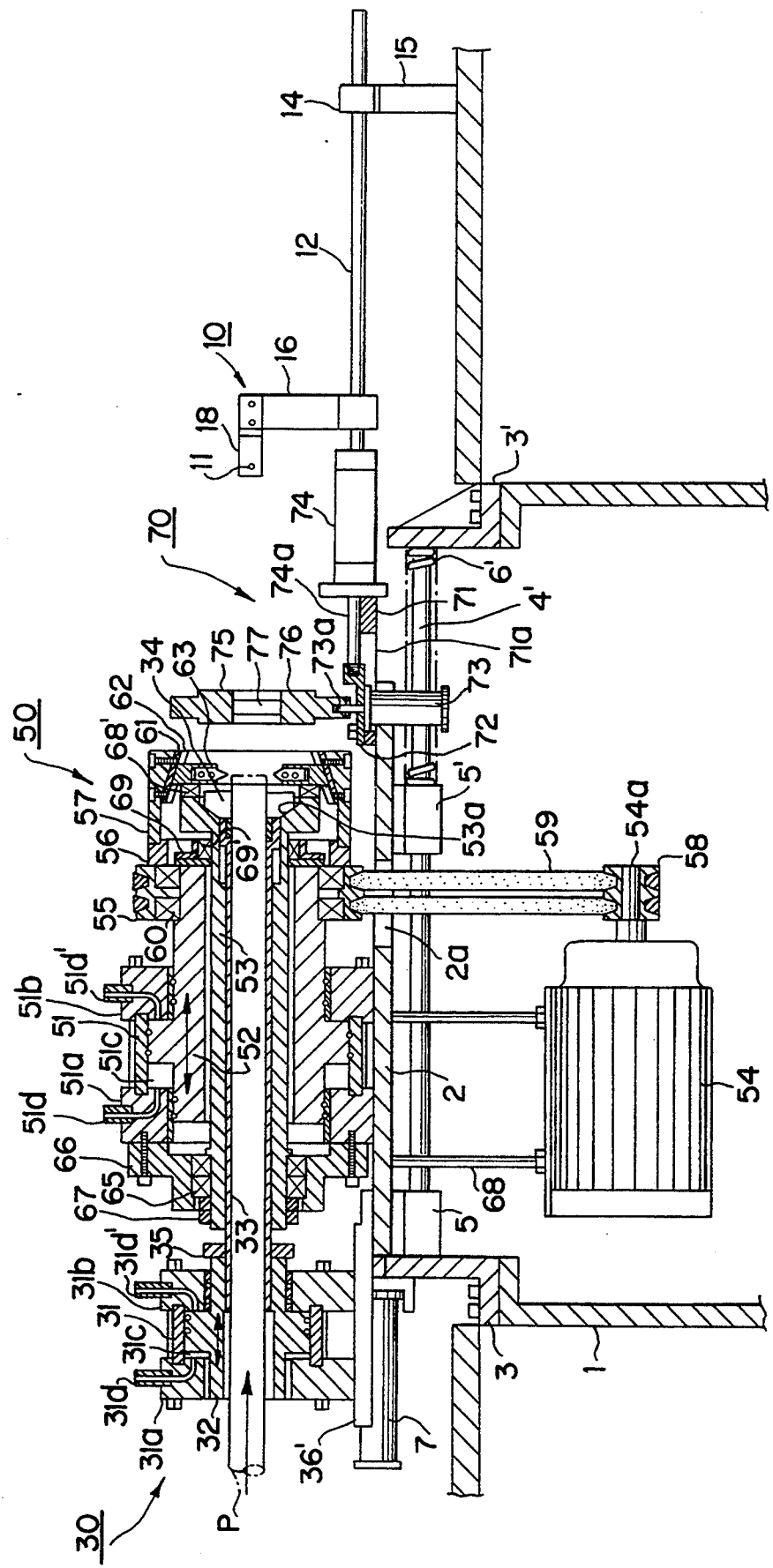
FIG. 5 is a front, sectional view of FIG. 4.

Referring to the drawings, particularly to FIGS. 4 and 5, the automatic pipe cutting device of the present invention comprises a main body 1 incorporating a motor 54, a base plate 2 mounted on the main body for supporting the device of the present invention, a cutting length adjusting means mounted on an operating bar 12 on the base plate 2 and operated by an optical sensor 11, a pipe fixing means 30 incorporating an air cylinder 31 fixed to the front end of the base plate 2, for pressingly fixing a pipe P having been adjusted in its cutting length, a guide pipe 33 and a slotted clamp member 34, a pipe cutting means 50 incorporating an air cylinder 51, pulleys 55 for receiving the power of the motor 54 and a cylindrical member 57 having cutting means therein and being connected to pulleys 55 for cutting a fixed pipe, a pipe discharge means 70 mounted at the rear end of the pipe cutting means 50 for discharging a cut pipe.

The main body 1 is of a box-shape which is opened on the top thereof and has a control box (not shown) at one side thereof.

Support cross frames 3 and 3' are fixed on the main body 1 at left and right upper faces thereof (in the drawings, the left side corresponds to the front part and the right side, rear part of the device of the present invention). Parallel spaced guide bars 4 and 4' are mounted between the support cross frames 3 and 3'. Bearing housings 5 and 5' having sliding bearings therein, and springs 6 and 6' are mounted on the guide bars 4 and 4'.

The base plate 2 is fixed on the bearing housings 5 and 5' so as to move sidewards (i.e., from the front to the rear part of the device, and vise versa) simultaneously with the bearing housings 5 and 5' along the guide bars 4 and 4'. Air cylinder 7 is mounted on the left end of the support frame 3 and piston rod 7a is in contact with the base plate 2.

Figure 6:
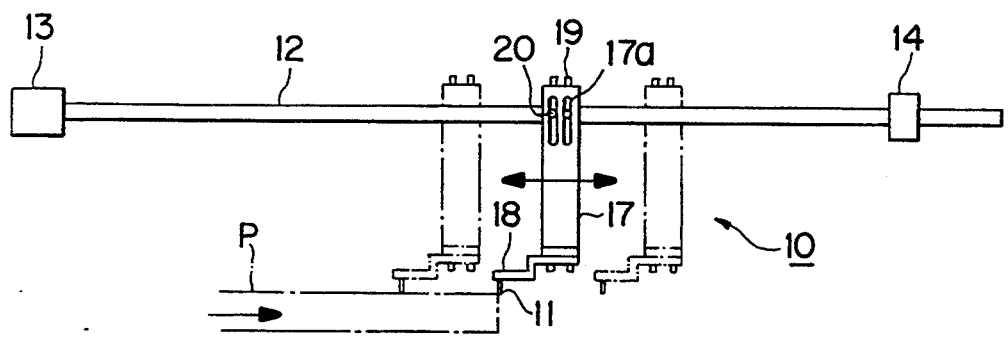
FIG. 6 is a plan view of a pipe cutting length adjusting means of the present invention.
Figure 7:
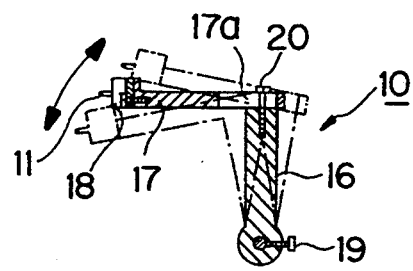
FIG. 7 is a side, sectional view of FIG. 6.

As shown in FIGS. 6 and 7, the pipe cutting length adjusting means 10 comprises operating bar 12 mounted on the main body 1 and base plate 2, and optical sensor 11 mounted on the operating bar 12.

The front end of the operating bar 12 is inserted in a holder 13 on the base plate 2 and the rear end of the operating bar 12 is slidably received in bearing housing 14 fixed on the support member 15 of the main body 1.

The optical sensor 11 is mounted on a bracket 18 which is connected to a holder 16 inserted in the operating bar 12 through a bracket 17. The holder 16 is bolted to the operating bar 12 by means of a bolt 19 so that it may be moved axially by tightening and releasing of the bolt. The bracket 17 is connected to the holder 16 by a bolt 20 through a slit 17a so that it may be rotated in the circumference direction of the axis. With the arrangement, the vertical, forward and rearward, or left and right movement of the optical sensor 11 may be adjusted.

Figure 8:
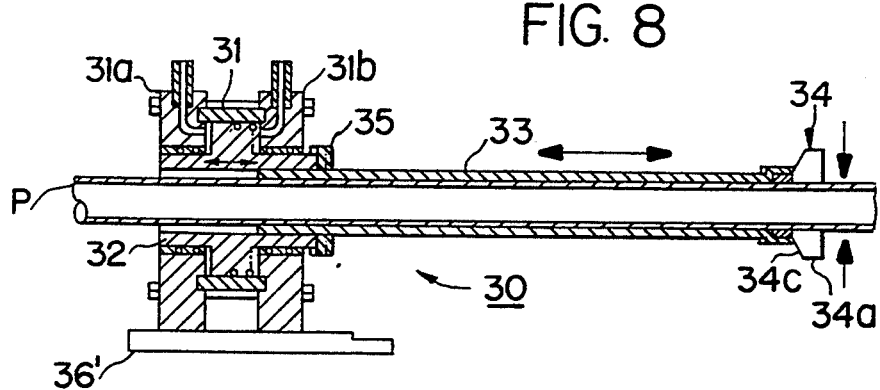
FIG. 8 is a front, sectional view of a pipe fixing means of the present invention.
Figure 9:
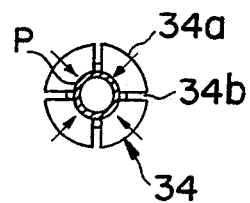
FIG. 9 is a side view of FIG. 8.

As shown in FIGS. 8 and 9, the pipe fixing means 30 comprises air cylinder 31, guide pipe 33 connected to the piston rod 32 of the air cylinder and slotted clamp member 34.

The air cylinder 31 is fixed by means of supporting members 36 and 36' at the left or front end of the base plate 2 and operated by the air which is supplied from air supply pipes 31d and 31d' to a space 31C between the piston rod 32 and opposite wall members, i.e., cylinders 31a and 31b. The piston rod 32 is hollow for receiving a pipe P.

The guide pipe 33 is inserted in a fixed pipe 53 which will be described hereinafter. The guide pipe 33 is threaded with the piston rod 32 at the front or left end thereof and receives pipe P.

The slotted clamp member 34 is threaded with the right or rear end of the guide pipe 33 and comprises a plurality of radial extensions 34a and slots 34b. Each of the extensions 34 has a tapered, slanted left face which comes in contact with the slanted face 53a of the fixed pipe 53.

In this condition, a release-preventing nut 35 is provided between the piston rod 32 and guide pipe 33 for preventing releasing and location changing of the slotted clamp member 34.

The pipe cutting means 50 comprises an air cylinder 51, a fixed pipe 53 received in the piston rod 52 of the air cylinder 51, pulleys 55 mounted at the rear or left end of the piston rod 52, a cylindrical member 57 having cutting bits 63 therein and a motor 54 for supplying the rotation force to the cylindrical member 57 through pulleys 55.

The air cylinder 51 is fixed on the center of the upper face of the base plate 2 and receives the fixed pipe 53 in the piston rod 52 thereof.

Bearing 65 is provided between bearing cap 66 fixed to the cylinder 51a and the left end of the fixed pipe 53. Bearing 69' is provided between bracket 69 fixed to the piston rod 52 and the right end of the fixed pipe 53. Since the fixed pipe 53 has the tapered inner end face 53a, when the piston rod 52 is moved to the left, the tapered face 53a presses the slanted face 34C of the slotted clamp member 34 causing the extensions 34a to be puckered up toward the center and press the pipe P.

A nut 67 is attached to the left or front end of the fixed pipe 53 for preventing falling off of the bearing 65. Bearing 68' is mounted on the rear end of the fixed pipe 53 for supporting a bit holding member 62.

The motor 54 is suspended from the underside of the base plate 2 through a bolt 68 and has pulleys 58 mounted on the shaft 54a thereof.

The pulleys 55 are mounted on the periphery of the piston rod 52 by means of a bearing 60 and connected to the pulley 58 on the motor shaft 54a through belts 59 which pass through an opening 2a in the base plate 2.

Figure 10:
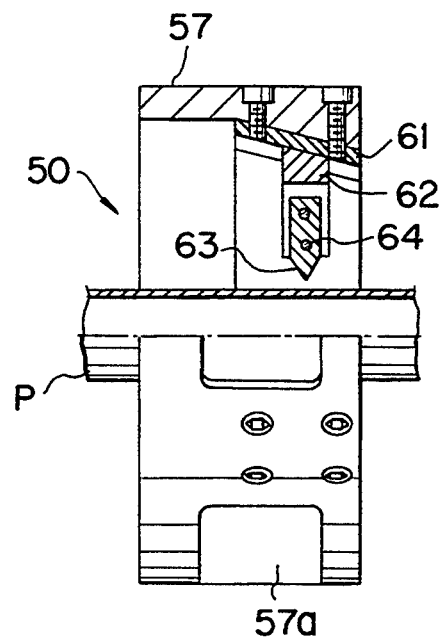
FIG. 10 is a sectional view of the half of a pipe cutting means of the present invention.
Figure 11:
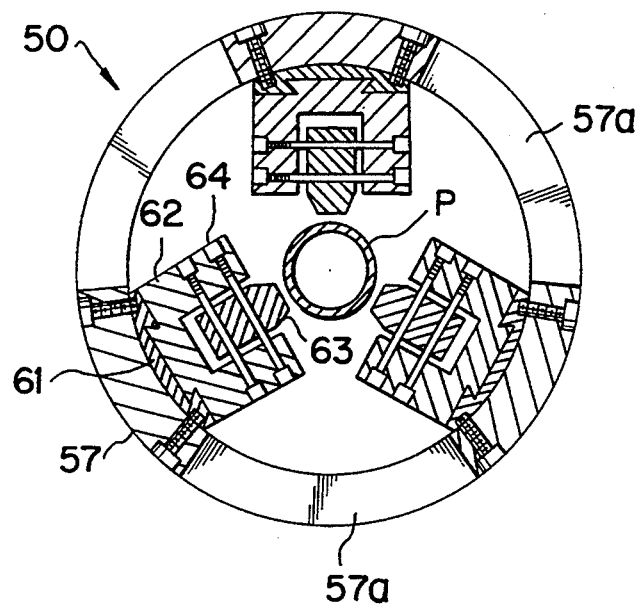
FIG. 11 is a side, sectional view of FIG. 10.

As shown in FIGS. 10 and 11, the cylindrical member 57 is connected to the pulleys 55 through a connecting member 56, and has inner face become narrower toward the rear end thereof. The periphery of the cylindrical member 57 is provided with a plurality of through opening 57a for discharging cut chips.

A plurality of guide rails 61 are fixed to the inner side of the slanted face of the cylindrical member 57. Each of the guide rails 61 slidably engages a bit holding member 62. The left or front face of the bit holding member 62 is supported by a bearing 68' at the rear end of the fixed pipe 53. A bit 63 engages each of the bit holding member 62 by bolt 64 and the tip of the bit 63 is directed to the center of the pipe.

Figure 12:
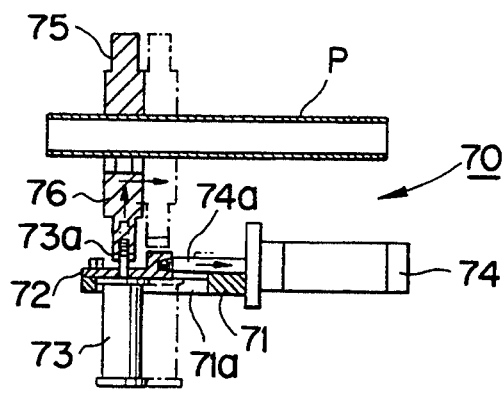
FIG. 12 is a front view of a pipe discharging means of the present invention.
Figure 13:
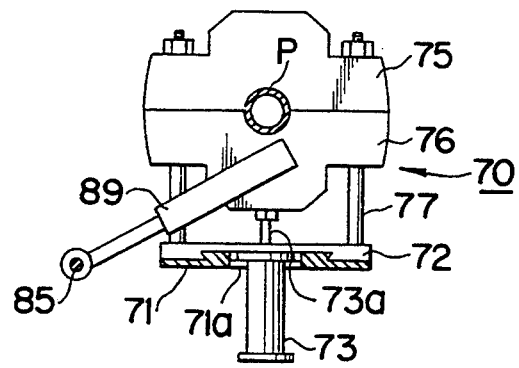
FIGS. 13 and 14 are sectional views of FIG. 12.
Figure 14:
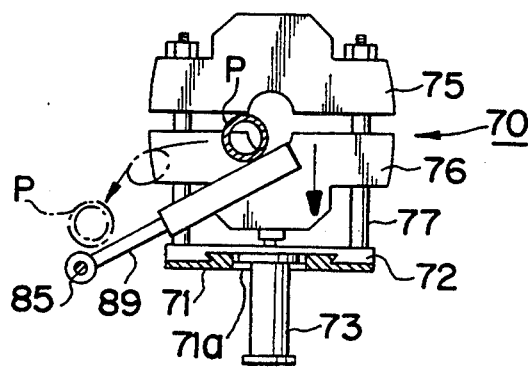

As shown in FIGS. 12 and 14, the pipe discharging means 70 comprises upper and lower clamps 75 and 76 which are mounted such that they can be fed sidewards by guide plate 72 along the guide rail 71, an air cylinder 74 connected to the one of the guide plate 72 for the sideward feeding of upper and lower clamps 75 and 76, an air cylinder 73 mounted below the guide rail, chute 89 mounted on the operating bar 85 for guiding pipe P and limit switches 78 and 83 for controlling the air cylinders 73 and 74.

The guide rail 71 is fixed to the rear end of the base plate 2 and has a guide opening 71a through which upper and lower clamps and air cylinder 73 connected thereto can be moved.

The guide plate 72 engages the upper end of the guide rail 71 and the right or rear end of thereof is connected to the piston rod 74a of the air cylinder 74.

The upper and lower clamps 75 and 76 supported by guide post 77 are mounted on the guide plate 72. The air cylinder 73 having the piston rod 73a thereof connected to low clamp 76 is provided below the guide plate 72 for moving low clamp 76 vertically along the guide post 77. The limit switch 78 for actuating air cylinders 73 and 74 by sensing the pipe cut-finished state is attached to one of the cylinder 51a of the air cylinder 51. The guide rail 79 is attached to the other cylinder 51b and receives the operating bar 80 for operating the limit switch 78. The operating bar 80 has the front end thereof engaged with a bolt 82 and the rear end thereof connected through a bolt 81 to the piston rod 52 which is exposed outwards and in the left of the pulleys 55. With this arrangement, the moment the cut of the pipe is finished, the head of the bolt 82 will contact with the limit switch 78.

For discharging the cut pipe, limit switch 83 is fixed to one side of the guide rail 71 for releasing the clamped state of the two clamps 75, 76. To the other side of the guide rail 71 is fixed to an operating bolt 84 of the limit switch 83. The front end of the operating bar 85 is inserted in holder 86 on the base plate 2 and the rear end thereof is slidably received in bearing housing 88 fixed to the upper end of the support member (not shown) of the main body 1.

Chutes 89 for discharging the pipe from the clamped state to a packaging case are slantedly bolted to the operating bar 85. When needed, the bolt 87 is released for adjusting the slanted angle of the chutes 89 and the diameter to the length of cut pipe P.

The operation and efficiency of the automatic pipe cutting device is described below.

When the motor 54 is put on load, the rotating force of the motor 54 through the belts 59 enables the pulley 55, connecting member 56 and cylindrical member 57 to rotate, thus rotating the bits 63 in the cylindrical member 57 at high speed. In this condition, the pipe P which went through a pipe manufacturing process is inserted into the piston rod 32 of the air cylinder 31 and then fed through the guide pipe 33, slotted clamp member 34 and the two clamps 75 and 76. When one end of the pipe P reaches the optical sensor 11 of the cutting length adjusting means 10, the optical sensor 11 will operate the piston rod 32 of the air cylinder 31 of the pipe fixing means 30 through control box.

In this condition, the pipe P will have the cutting length from the cutting bit 63 to the optical sensor 11.

As air is introduced into the air cylinder 31 through the air supply pipe 31d', the piston rod 32 is moved forwards or to the left, thus pulling the threaded guide pipe 33. This causes the slotted clamp member 34 to move simultaneously. In this condition, the slotted clamp member 34 has its slanted face 34C come in slidingly contact with the slanted face 53a of the fixed pipe 53 and it is puckered up through the slots 34b, thus clamping the pipe P having been inserted therein.

When the inserted pipe P is clamped, the continuously feeding force of the the pipe P allows the base plate 2 and the bearing housings 5 and 5' to move simultaneously with the pipe P along the guide bars 4 and 4'. This causes every elements mounted on the base plate 2 to be fed simultaneously with the base plate 2. In this condition, the springs 6 and 6' of the guide bars 4 and 4' are compressed. The reason why every elements on the base plate 2 are fed simultaneously with the pipe P is that the pipe P may be allowed to be cut while being fed continuously. After the cut of the pipe P is completed, the clampling of the pipe P is released and the springs 6 and 6' return to their original position.

When the pipe P is held in place, the air cylinder 7 mounted on one of the support frames 3 actuates its piston rod 7a to serve to pull the base plate 2 so as to eliminate the overloading on the pipe P.

In addition, when the pipe P is fixed in place, the air cylinder 51 of the pipe cutting means 50 operates. The supply of air through the air supply pipe 51d' allows the piston rod 52 to pull to the left or forwards the pulley 55, connecting member 56 and cylindrical member 57 which are being rotated. Since, in this condition the guide rails 61 fixed to the tapered face inside the cylindrical member 57 are fed simultaneously with the cylindrical member 57, the bit holding members 62 and bits 63 are pushed towards the center of the pipe P or in a direction perpendicularly to their feeding direction upon the movement of guide rails formed on the tapered inner face of the cylindrical member. This allows the bits in rotation to cut the pipe P.

Each of the bit holding members 62 has its outer surface contact with the recess in the guide rail 61 so as to move in relation to the guide rail 61, and its one side face supported by the bearing 68' at the rear end of the fixed pipe 53. With this arrangement, when the guide rail 61 is moved to the left, the bit holding members 62 will not be fed simultaneously with the guide rail 61 but puckered up inwardly to such a degree of inclined angle of the guide rail 61. This causes the bits 63 fixed to the holding members 62 to rotate at high speed and be puckered up towards the center, allowing the tips of the bits 63 to cut the pipe P.

The chips produced during the process are discharged through the discharge opening 57a. Through the discharge opening 57a, a worker can identify the cutting condition by the naked eye. While the piston rod 52 of the air cylinder 51 is fed to the left, the bolt 82 connected to the operating bar 80 is fed simultaneously, thus completing the cutting of the pipe P. At the same time, the bolt 82 comes in contact with the limit switch 78, thus actuating the pipe discharge means 70.

After the cutting of the pipe P is completed, the limit switch 78 actuates the air cylinder 73 of the pipe discharge means 70 to enable the lower clamp 76 to move upwards, whereby the pipe having been cut is fixed between the two clamps 75 and 76 and the piston rod 74a of the air cylinder 74 draws the guide plate 72. With this operation, the guide plate 72, clamps 75 and 76, air cylinder 73 and pipe P having been cut, are moved backwards. When the bolt 84 of the guide plate 72 actuates the limit switch 83 on the guide rail 71 during the backward movement, the limit switch 83 allows the air cylinder 73 to return to its original state.

Accordingly, the piston rod 73a of the air cylinder 73 together with the lower clamp is moved downwards, thus releasing the clamping state, whereby the pipe P having been cut, falls down the chute 89 by its own weight. Thereafter, the fallen cut pipe P is guided along the chute 89 and moved to a packaging case.

During the above process, the moment the clamping of the cut pipe P is released by means of the limit switch 83, the base plate 2 and each element of this invention return to their original position and repeat the same operation. With the repeated operation, the pipe P is cut continually.

As described above, the automatic pipe cutting device of the present invention utilizes the optical sensor 11 and limit switches 78 and 83 to achieve automatically the adjustment of the cutting length, fixing, cutting and discharging of the pipe P. With the device of the present invention, the productivity will be improved and the manufacturing cost will be reduced. In addition, since the bits 63 are used as cutting means, the pipe P will be cut uniformly and the cutting faces of the pipe P will be smooth, whereby the reliability of the quality of products will be increased.

Furthermore, pipe P can be cut regardless of the thickness thereof and an accident is not likely to happen.

It is realized that other modifications and changes will occur to those skilled in the art. It is therefore to be understood that the appended claims are intended to cover all such modifications as fall within the true spirit and scope of the invention.

What is claimed is:

1. An automatic pipe cutting device comprising:
    a box-shaped main body having an opened top;
    two generally parallel supporting frames fixed to the main body;
    first and second guide bars transversely fixed to the supporting frames;
    a base plate having first and second bearing housings movable along the guide bars;
    a pair of springs wound around said second guide bar, the springs being disposed between said bearing housing and one of said supporting frames;
    a pipe fixing member including a first air cylinder disposed in a pipe entrance on said base plate, a hollow piston rod movable within a space in said first air cylinder, the hollow piston rod being moved in response to air supplied by the first air cylinder, the pipe fixing member further including a slotted clamp and a pressure rod, the slotted clamp being attached to said hollow piston rod through nuts which guide delivery of a pipe, the pressure rod being fixed to a rear portion of said slotted clamp, whereby upon delivery, the pipe is clamped by pressing the pressure rod centrally inwardly when the hollow piston rod moves to the pipe entrance area;
    a pipe cutting member including
        a second air cylinder fixed to said base plate adjacent to said pipe fixing member,
        a hollow piston rod for moving along an interior wall of said second air cylinder in response to a direction of air supply to the second air cylinder,
        a fixing pipe having a slant face for slidably contacting with a tapered slant face of said pressure rod, said fixing pipe inserting between said piston rod and said pipe fixing member and fixing to said second air cylinder,
        a pulley having a first bearing disposed on a circumferential surface of a rear portion of said piston rod,
        a tubular member having a plurality of guide rails disposed on a gradually narrowing slant face, the tubular member being connected to said pulley for rotating with the pulley, and
        a bit holding member supported by a second bearing disposed on a rear edge of the fixing pipe, said bit holding member being provided with a cutting bit fixed to one edge and
    said guide rail being fixed to an other edge thereof, whereby
    the pipe cutting member cuts the pipe by the cutting bit which rotates when the pipe fixing member presses the pipe, the piston rod pulls the rotating tubular member to the pipe entrance area and the bit holding member engaged with the guide rails is transported to a center thereof;
    an operating bar being fixed to said base plate at one end and being supported by a bearing housing at an other end thereof;
    a pipe cutting length adjusting member for adjustably fixing a position of said operating bar and for detecting passage of the pipe continuously and then immediately transmitting a signal to clamp a delivered pipe; and
    a pipe discharging member and for detecting completion of pipe cutting by the pipe cutting member and for discharging a cut pipe from the pipe cutting apparatus.

2. The automatic pipe cutting device according to claim 1, wherein in the pipe cutting length adjusting means, opposite ends of the operating bar are inserted in a holder and bearing housing on the main body and the base plate, a bracket having an optical sensor mounted thereto is connected to a holder inserted in the operating bar through a bracket, whereby the optical sensor will sense the cutting length of a pipe which is being fed.

3. The automatic pipe cutting device according to claim 2, wherein the holder engages the operating bar by a bolt and with the bracket through a slit and a bolt so that the bolts may be tightened and released, whereby the cutting length of the pipe may be adjusted by adjusting a location of the optical sensor on the operating bar.

4. The automatic pipe cutting device according to claim 1, wherein a release preventing nut is engaged with the guide pipe and with the piston rod.

5. The automatic pipe cutting device according to claim 1, wherein the slotted claim member has a plurality of radial extensions, slots, left tapered faces for slidably contacting with the slanted face of the fixed pipe.

6. The automatic pipe cutting device according to claim 1, wherein in the pipe cutting device, the second air cylinder having the hollow piston rod is fixed to an upper end of the base plate, the fixed pipe inserted in the piston rod has a leading end supported by one cylinder, bearing and bearing cap and a rear end supported by the piston rod through a bearing and a bracket, a motor being supported from an underside of the base plate and having a motor shaft connected to the pulleys through belts, a cylindrical member being connected to a rear end of the pulleys through connecting member, a plurality of guide rails being slantedly attached to an inner face of the cylindrical member, each of the guide rails having a bit holding member engaged therewith, the bit holding member having a cutting bit fixed thereto, the bit holding member having a face connected to the rear end of the fixed pipe by a bearing, whereby when the bit is rotated by the motor, the bit will be moved to the center of the pipe to cut the pipe.

7. The automatic pipe cutting device according to claim 6, wherein a plurality of chip-discharging openings are provided on a periphery of the cylindrical member for discharging and verification of cutting of the pipe.

8. The automatic pipe cutting device according to claim 1, wherein in the pipe discharging device, a guide rail having a guide opening is fixed to the base plate, a guide plate is mounted on the guide rail, upper and lower clamps supported by a guide post are mounted on the guide plate, air cylinders are respectively provided at a rear end of the guide rail and below the guide plate and operated by limit switches, piston rods of the air cylinders are respectively connected to the guide plate and the lower clamp, a plurality of chutes are slantedly fixed to an operating bar inserted in a bearing housing and a holder on the main body and the base plate, whereby forward and rearward movement of the upper and lower clamps by the air cylinders will clamp and release a pipe having been cut and will discharge the cut pipe by the chutes.

9. The automatic pipe cutting device according to claim 8, wherein the limit switch is one of the cylinder of the second air cylinder, a guide rail is attached to the other cylinder, an operating bar connected to the piston rod by a bolt is inserted in the other cylinder, a bolt opposite to the limit switch engages the leading end of the operating bar, whereby the operating bar is moved rearward and forward together with the piston rod to actuate the limit switch, thus controlling the second air cylinder.

10. The automatic pipe cutting device according to claim 8, wherein the limit switch is fixed to the rear end of the guide rail, a bolt is connected to the guide plate opposite to the limit switch, whereby the rearward and forward movement of the bolt along the guide plate will control the air cylinder.

11. The automatic pipe cutting device according to claim 8, wherein the chutes are connected to the operating bar by a bolt, whereby an inclined angle of the chutes and distance between the chutes will be adjusted upon releasing and tightening of the bolt.

12. The automatic pipe cutting device according to claim 1, wherein said base plate is provided with a third air cylinder disposed at one edge of the base plate, the third air cylinder compressing said pair of springs to assist backward movement of the base plate when the pipe fixing member clamps the delivering pipe.

* * * * *